(12) United States Patent
Cheung et al.

(10) Patent No.: US 7,619,749 B2
(45) Date of Patent: Nov. 17, 2009

(54) METHODS AND APPARATUS OF ALIGNING SURFACES

(75) Inventors: Chi-Fai Cheung, Hung Hom (HK);
Huifen Li, Hung Hom (HK); Wing-Bun Lee, Hung Hom (HK); Suet To, Hong Hom (HK); Lingbao Kong, Hung Hom (HK)

(73) Assignee: The Hong Kong Polytechnic University, Hong Kong SAR (CN)

( * ) Notice: Subject to any disclaimer, the term of this patent is extended or adjusted under 35 U.S.C. 154(b) by 307 days.

(21) Appl. No.: 11/511,361

(22) Filed: Aug. 29, 2006

(65) Prior Publication Data

US 2007/0195084 A1 Aug. 23, 2007

(30) Foreign Application Priority Data

Feb. 3, 2006 (HK) ................ 06101523.8

(51) Int. Cl.
*G01B 11/24* (2006.01)
*G06T 15/40* (2006.01)
*G09G 5/00* (2006.01)
*G06F 17/50* (2006.01)
*G06F 17/10* (2006.01)

(52) U.S. Cl. .............. 356/601; 345/421; 345/619; 703/1; 703/2

(58) Field of Classification Search .......... 345/619, 345/421; 356/601; 703/1, 2
See application file for complete search history.

(56) References Cited

U.S. PATENT DOCUMENTS 3,871,771 A * 3/1975 Scott ................. 356/364
4,264,208 A * 4/1981 Haberl et al. ............. 356/609
5,438,417 A * 8/1995 Busch et al. .............. 356/394
5,542,032 A * 7/1996 Pritt ......................... 345/421
2003/0091226 A1* 5/2003 Cahill et al. .............. 382/154
2006/0114475 A1* 6/2006 De Groot et al. .......... 356/497

OTHER PUBLICATIONS

J. Huazhong Univ. Of Sci & Tech., vol. 25, No. 3, Mar. 1997, pp. 1-4, A New Algorithm for the Profile Error of a Parameter . . . .
Rentoul et al, Computer Integ. Manuf. Syst. 7(3), 1994, pp. 173-178, Interpretation of errors from inspection results.
Qiu et al, Intl. Jour. of Machine Tools & Manf. 40, 2000, pp. 259-275, A practical evaluation approach towards form . . . .
Kase et al, Computer-Aided Design 31, 1999, pp. 495-505, Shape error evaluation method of free-form surfaces.
Mech. Sci. & Tech., vol. 20, No. 3, May 2001, 4 pgs., Modelling and Analysis of the Best Match in Free-form Surface.

* cited by examiner

*Primary Examiner*—Xiao M Wu
*Assistant Examiner*—David T Welch
(74) *Attorney, Agent, or Firm*—Jacobson Holman PLLC

(57) ABSTRACT

Ultra-precision freeform surfaces are important to the development of complex and micro-optical-electro-mechanical devices used in many photonics and telecommunication products such as F-theta lenses for laser printers. These surfaces are complex and large scale surface topologies with shapes that generally possesses no rotational symmetry. Due to the geometrical complexities of these ultra-precision freeform surfaces, it is difficult to characterize the form accuracy and surface quality of freeform optical surfaces. The method of this invention is based on feature-point pre-fixture, and iterative precision alignment algorithm, which can provide sufficient capability of form characterization for ultra-precision freeform surfaces with form accuracy down to below sub-micrometer range

26 Claims, 10 Drawing Sheets

METHODS AND APPARATUS OF ALIGNING SURFACES

FIELD OF THE INVENTION

This invention relates to methods and apparatus of aligning surfaces, particularly those requiring high precision of alignment to the nanometer level.

BACKGROUND OF THE INVENTION

Ultra-precision freeform surfaces are important to the development of complex and micro-optical-electro-mechanical devices used in many photonics and telecommunication products such as F-theta lenses for laser printers. However, these surfaces are complex and large scale surface topologies with shapes that generally possesses no rotational symmetry. The geometry of these surfaces usually cannot be generalized by a single optical equation such as the universal optics equation used for aspheric surfaces. To fulfill the stringent requirements for advanced optics applications, these ultra-precision freeform surfaces are usually fabricated by ultra-precision freeform machining technology, and the surface finishes with sub-micrometer form accuracy requirement in at least sub-micrometer, often nanometer, range.

Due to the geometrical complexities of these ultra-precision freeform surfaces, it is difficult to characterize the form accuracy and surface quality of freeform optical surfaces. Although some surface parameters have been proposed by the ISO project, their applicability of practical inspection is limited to optical surfaces possessing rotational symmetry. The general principle of form characterization of the freeform surfaces was analyzed by Xiong [Y. L. Xiong, The mathematic approach of precision measurement, Beijing: Metrology Press, China, 1989]. He thought the key was to make the measured surface composed of a series of discrete points overlapping with the theoretically designed surface in the conditions of the least area with the shift and rotation of coordinates. By making the sum of distance of all measured points from the theoretic designed surface, the form error was obtained. The characterization results are usually obtained only when the effect of systematic errors was eliminated.

However, two non-linear problems must be solved. One of them is the solution of the coordinate transfer to ensure the consistence of the measured coordinates with the designed coordinates while the other is to compute the projection of the measured points after the coordinate transfer on the theoretic surface. The best matching method for form characterization of the freeform surfaces was proposed [A. H. Rentoul and G. Medland, Interpretation of errors from inspection results, Computer Integrated Manufacturing Systems, 1994, 7(3): 173-178]. By shifting and rotating the coordinates, the feature points, feature lines and feature planes of the measured and design surfaces were overlapped completely and the best alignment was attained. The systematic error from the coordinate disagreement was removed. The method was based not only on the least square criterion but also the least area principle. Based on the best matching method, Wang et al. [P. J. Wang, J. H. Chen, and Z. Q. Li, A new algorithm for the profile Error of a parameter surface, Journal of Huazhong University of Science & Technology, 1997, 25(3): 1-4] presented a new algorithm with iterative approximation of the form error of freeform surfaces. After the matching of the coordinates, the least area of the approximated form error was obtained by the iterative coordinate transfer.

Kase et al. [K. Kase, A. Makinouchi, T. Nakagawa, et al., Shape error evaluation method of free-form surfaces, Computer-aided design, 1999, 31: 495-505] used the main curvature change of the measured and design surface to conduct local characterization while the global characterization was conducted based on the normal vector. Hua et al. [H. Hua, Y. B. Li, K. Cheng, et al., A practical evaluation approach towards from deviation for two-dimensional contours based on coordinate measurement data, International Journal of Machine Tools and Manufacture, 2000, 40(1): 259-275] divided the 2D contour profiles into straight and curved parts to characterize the form error. Each curve was represented by its optimal interpolation circular arc segment. The form deviation of a measured point is defined as the distance from the point to its corresponding straight or circular segment. The deviation of the geometrical form of the contour profile is evaluated using the least square method. Based on the minimum principle, Yu et al. [Y. Yu, J. Lu and X. C. Wang, Modeling and analysis of the best matching free-form surface measuring, Mechanical Science and Technology, 2001, 20(3): 469-471] used the rotation and movement of the freeform surface to perform the pre-location of measured surface. The systematic error was eliminated effectively by the best matching. According to an improved algorithm of coordinate alternation, the precise adjustment of measured coordinates was accomplished and the profile error of the freeform surface was obtained.

Although the significant achievement has been obtained in the characterization of freeform surface, it was found that the above methods are inadequate to characterize ultra-precision freeform surfaces with form error in sub-micrometer range. There is a need to develop new method to characterize surfaces, particularly freeform surfaces, so that sub-micrometer form error can be identified.

OBJECTS OF THE INVENTION

Therefore, it is an object of this invention to provide methods to characterize surfaces, particularly freeform surfaces, so that sub-micrometer form error can be identified. It is also an objection of this invention to resolve at least one or more of the problems as set forth in the prior art. As a minimum, it is an object of this invention to provide the public with a useful choice.

SUMMARY OF THE INVENTION

Accordingly, this invention provides a method of aligning a first surface with a second surface. $P(x_i,y_i,z_i)$ is any point on the first surface and $Q(x'_i,y'_i,z'_i)$ is any point on the second surface. The first surface and the second surface are separated by a first-degree separation, a second-degree separation, and a third-degree separation. The first-degree separation is minimized first selecting at least one feature point form each of the first surface and the second surface. The coordinates of the second surface are then adjusted to minimize the distance between the at least one feature point of each of the first surface and the second surface to be below a predetermined threshold value $\theta$.

The second-degree separation is then minimized by first dividing the first surface into a plurality of first zones, each first zone having at least one first coordinate defining said first zone. Similarly, the second surface is divided into a plurality of second zones, each second zone having at least one second coordinate defining said second zone. For the plurality of first zones, the following steps are repeated:

a) obtaining distances between the at least one first coordinate and each of the plurality of second zones;

b) comparing the distances obtained in step a) to determine a pair of corresponding zones on the first and the second surfaces having a minimum distance obtained in step a);

until all zones on the on the first and the second surfaces are paired. The distances between each pair of corresponding zones on the first and the second surfaces are then determined and summed. The coordinates of the second surface are adjusted to minimize the summation of the distances between each pair of corresponding zones to be below a predetermined threshold value $\epsilon$.

To minimize the third-degree separation, a transfer matrix T is minimized to be below a predetermined threshold value $\lambda$ by adjusting at least one pair of parameters, one relates to translation and the other relates to rotation, along a direction.

Preferably, the at least one feature point includes five feature points. More preferably, the five feature points includes a gravity center point G and four corner points. Additionally, the gravity center point G is identified by the equation $$G(x_G, y_G, z_G) = \sum_{i=1}^{n} \alpha_i(x_i, y_i, z_i)$$

wherein $\alpha$ is a weighting coefficient satisfying $\Sigma\alpha_i=1$, $\alpha_i=1/n$ with n being the number of points in the respective measured and normal surfaces. Further, the four corner points are identified as the four points that are farthest from the gravity center point G.

Preferably, $Q(x'_i,y'_i,z'_i)$ is obtained through a set of coordinates processed by a parameterization algorithm selected from the group consisting of Bezier surface algorithm, B-Spline algorithm, and Non-Uniform Rational B-Spline algorithm.

Optionally, each zone has a square shape.

Advantageously, three pairs of parameters are adjusted along respective three orthogonal directions. Preferably, the transfer matrix T is defined as:

$$T(t_x, t_y, t_z, \alpha, \beta, \gamma) = \begin{bmatrix} \cos\beta\cos\gamma & \sin\alpha\sin\beta\cos\gamma - \cos\alpha\sin\gamma & \cos\alpha\sin\beta\cos\gamma + \sin\alpha\sin\gamma & t_x \\ \cos\beta\sin\gamma & \sin\alpha\sin\beta\sin\gamma + \cos\alpha\cos\gamma & \cos\alpha\sin\beta\sin\gamma - \sin\alpha\cos\gamma & t_y \\ -\sin\beta & \sin\alpha\cos\beta & \cos\alpha\cos\beta & t_z \\ 0 & 0 & 0 & 1 \end{bmatrix}$$

where $\alpha$, $\beta$ and $\gamma$ are the rotation angles of the measured surface along x, y and z axes, respectively; and $t_x$, $t_y$ and $t_z$ are the parallel shifts in the x, y and z directions, respectively. More preferably, T satisfies an expense function of $$\text{Min}[F_j(T)] = \text{Min}\left[\sum_{i=1}^{m} |T_j Q_{i,j} - P_{i,j}|^2\right],$$

where $P_{i,j}=[x'_{i,j}, y'_{i,j}, z'_{i,j}, 1]^T$ is the closest point of the normal surface to the measured point $Q_{i,j}=[x_{i,j}, y_{i,j}, z_{i,j}, 1]^T$ after $j^{th}$ iteration of alignment, and m is the number of discrete points of the measured surface, and Min[ ] denotes the minimum function while $P_{i,j}$ is the projection point of $Q_{i,j}$ on the normal surface.

It is another aspect of this invention to provide a method of determining deviation between a first surface with a second surface, such that $P(x_i,y_i,z_i)$ is any point on the first surface and $Q(x'_i,y'_i,z'_i)$ is any point on the second surface, said first surface and said second surface being separated by a first-degree separation, a second-degree separation, and a third-degree separation, including the steps of:

aligning the first surface with the second surface according to the any one of the above methods;

calculating a distance $d_i$ between $P(x_i,y_i,z_i)$ and $Q(x'_i,y'_i,z'_i)$, wherein $d_i=\pm\sqrt{(x_i-x'_i)^2+(y_i-y'_i)^2+(z_i-z'_i)^2}$.

Preferably, the above method of determining deviation further includes the step of calculating a profile error $S_t$ wherein $S_t=|\max(d_i)-\min(d_i)|$.

Alternatively, 13. the above method of determining deviation further includes calculating a root mean square deviation $S_q$ wherein $$S_q = \sqrt{\frac{1}{m}\sum_{i=1}^{m} d_i^2},$$

wherein the second surface is defined by m number of measured points.

It is yet another aspect of this invention to provide apparatus including a processor incorporating the methods of this invention described above.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENT

This invention is now described by way of examples with reference to the figures in the following paragraphs.

Objects, features, and aspects of the present invention are disclosed in or are obvious from the following description. It is to be understood by one of ordinary skilled in the art that the present discussion is a description of exemplary embodiments only, and is not intended as limiting the broader aspects of the present invention, which broader aspects are embodied in the exemplary constructions.

Obtaining Coordinates of the Surfaces to be Compared

In order to compute the form error, the coordinates of the two surfaces must be known first. This section illustrates a number of different channels to obtain the required coordinates. It should be noted that these methods are generally known in the art, and this section wishes to assist the readers to understand that there are many ways to obtain the required coordinates of the surfaces.

Figure 1:
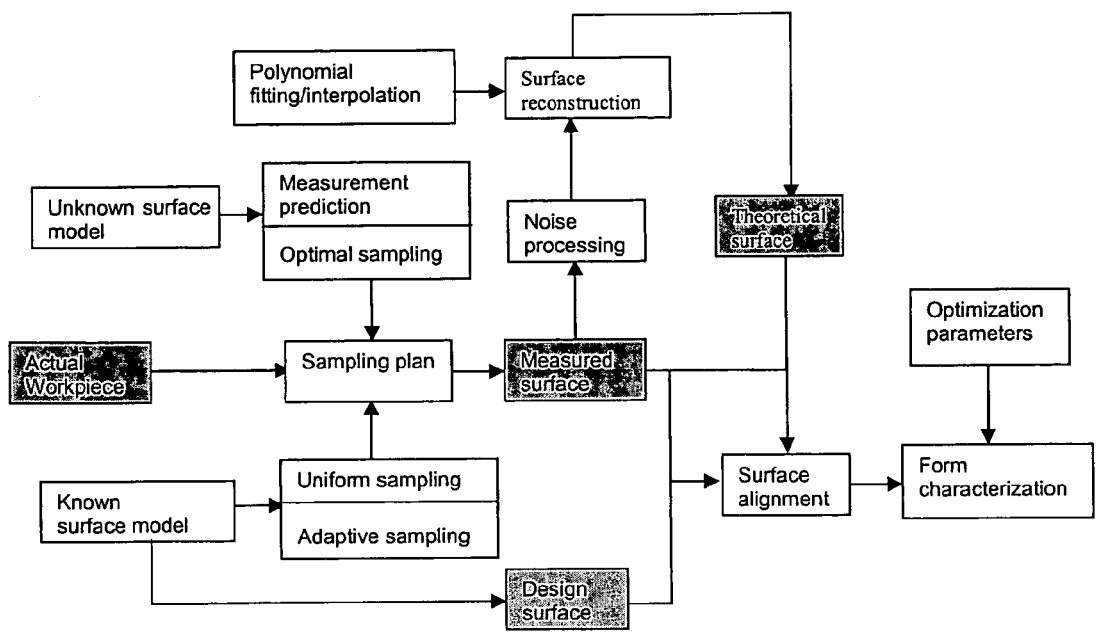
FIG. 1 shows a flow chart of typical form characterization for two surface patterns.

Due to the geometrical complexity, ultra-precision freeform surfaces are usually represented based either on a known surface model (which may be termed as a first surface, or the theoretical surface) or a cloud of discrete measured data for an unknown surface model (which may be termed as a second surface, or the measured surface). According to different surface generation patterns, the form characterization of the freeform surface is realized in the different ways as shown in FIG. 1, which is common to all methods of freeform surfaces characterization.

For the characterization of freeform surface with known surface model, coordinates of the measured and design surfaces can be used directly. If the surface model is not available and only a cloud of discrete measured data of the surface is provided, the unknown surface model can then be reconstructed to obtain the theoretical surface from the discrete measured data based on the polynomial fitting or interpolation. Suitable parameterization algorithm may include Bezier surface algorithm, B-Spline algorithm, and Non-Uniform Rational B-Spline algorithm. Then surface alignment and form characterization are performed. Further illustration of polynomial fitting or interpolation will not be provided here as this step is generally known in the art.

Three Degrees of Separation

In order to determine the form error, the two involved surfaces must first be aligned as closely as possible. Mathematically, the two surfaces are positioned in a free space with three degrees of separation. If there are no suitable procedures to minimize these three degrees of separations, it will be virtually impossible for the two surfaces to be aligned. All of these three degrees of separation should be minimized to be below respective threshold values so that the two surfaces can be considered as "aligned". These threshold values are to be determined according to the person skilled, in the art who practiced this invention. For example, if this method is to be used to characterize lens surfaces, the threshold values may be in millimeter to nanometer region, depending on the accuracy required.

Minimizing the First-Degree Separation

According to this invention, the first-degree separation is minimized by first selecting at least one feature point form each of the surfaces to be characterized. Then the coordinate of one of surfaces is adjusted to minimize the distance between said at least one feature point of each of the first surface and the second surface to be below a predetermined threshold value θ.

The feature point can be selected according to the user's own decision. Of course, using more feature point may assist in achieving better alignment between the two surfaces.

Figure 2:
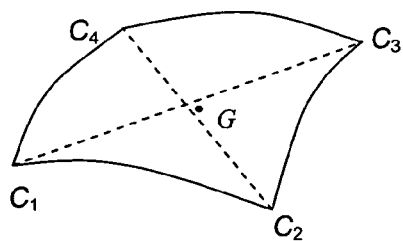
FIG. 2 shows exemplary feature points of a surface to minimize first-degree separation (pre-fixture)

According to a particular embodiment of this invention, five feature points are selected from each of the two surfaces. In this embodiment, the five feature points of the surface include four corner points Ci (i=1, 2, . . . , 4) and one gravity center G as shown in FIG. 2.

The gravity center represents the position vector of the surface in a three-dimensional space. It can be expressed by the weighting average of all the surface points. If $P(x_i,y_i,z_i)$ and $Q(x'_i,y'_i,z'_i)$ are any points on the measured and the theoretical surfaces, respectively. The corresponding gravity centers for the measured and theoretical surfaces are $G(x_G,y_G,z_G)$ and $G'(x'_G,y'_G,z'_G)$, respectively. They can be determined by Eqs. (1) and (2):

$$G(x_G, y_G, z_G) = \sum_{i=1}^{n} \alpha_i(x_i, y_i, z_i) \quad (1)$$

$$G'(x'_G, y'_G, z'_G) = \sum_{i=1}^{n} \alpha'_i(x'_i, y'_i, z'_i) \quad (2)$$

where $\alpha$ and $\alpha'$ are the weighting coefficients and should satisfy $\Sigma\alpha_i=\Sigma\alpha'_i=1$. For the surface sampled with the uniform interval, $\alpha_i=1/n$ and $\alpha'_i=1/n'$ are assumed with n and n' being the number of points in the measured and normal surfaces, respectively.

The four corner points in the measured surface are defined as the four points that are farthest from the gravity center and possess the biggest envelop area. C1 is the farthest point from the gravity center in the surface, C3 is the farthest from C1, C2 is the farthest from the vector composed of C1 and C3, and C4 is the farthest from C2.

Firstly, the gravity centers of measured and normal surfaces are overlapped completely in the spatial coordinates. As shown in Eq. (3), a coordinate shift should be done with the measured surface $$(x_i, y_i, z_i) = (x_i, y_i, z_i) + [(x'_G, y'_G, z'_G) - (x_G, y_G, z_G)] \quad (3)$$

Hence, the five-point pre-fixture may be conducted on the measured surface by minimizing the sum of the distance between the five characteristic points in the measured surface and the normal surface. After the pre-fixture operation, the measured and normal surfaces are located in a small deviation range, i.e. below a predetermined threshold value θ. It is found that this step improves the computing efficiency of the subsequent iterative adjustment processing and also avoids dropping in the dilemma of local optimization.

Minimizing the Second-Degree Separation

It should be noted that the two surfaces are relatively closely aligned to each other when they reach this step. At the very least, the two surfaces must be more closely aligned than before minimizing the first-degree separation.

In this step, each of the two surfaces is divided into a plurality of zones. Each zone has at least one point defining the zone. Mathematically, at least three points are required to define a "zone". However, if a predetermined grid is used, only one point may be sufficient to identify the zone. It should be noted that the shape of the "zone" is relatively unimportant, although square shape is preferred due to ease of computation. The number of zones to be divided on the surfaces relates to the "resolution" of the method of this invention. A person skilled in the art shall strike a balance between the available computation power and the required accuracy.

We now turn to one particular zone defined on one of the two surfaces, assuming that it is the theoretical surface. The distances between this zone on the theoretical surface and each of the plurality of zones on the measured are obtained or calculated. This should be relatively straightforward as there is at least one point identifying each zone. The minimum distance is then identified to determine a pair of corresponding zones on the first and the second surfaces. This step is repeated until all zones on the two surfaces are paired.

After all of the zones on the two surfaces are paired, a sum of all of the distances between each pair of corresponding zones on the first and the second surfaces are then obtained or calculated. The coordinates of one of the surfaces is then adjusted to minimize the summation of the distances between each pair of corresponding zones to be below a predetermined threshold value $\epsilon$.

Figure 3:
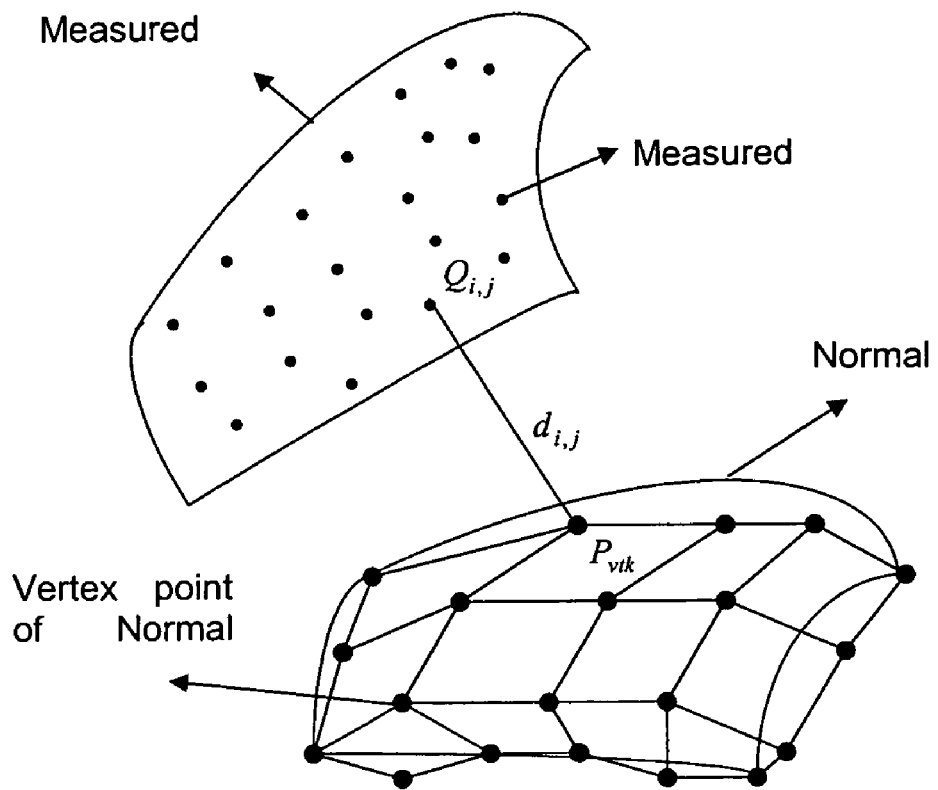
FIG. 3 shows an exemplary representation of the first iteration point and additional vertex points for computing the projection on a normal surface.

The above step will be explained in mathematical terms below. To find the projection point of $Q_{i,j}$ on the normal surface, the algorithm will get the first iterative point $P_{0i,j}$ which can be obtained by $$P_{0i,j} = \text{Min}(|Q_{i,j} - P_{vtk}|) \; k = 0, 1, \ldots N \quad (4)$$

where $P_{vtk}$ is the vertex point of the normal surface and N is the number of vertex points, as shown in FIG. 3.

After the first iterative point is obtained, the surface slice which the vertex is belonging to can be determined. Then the iteration algorithm of find projection point will be carried out.

Figure 4:
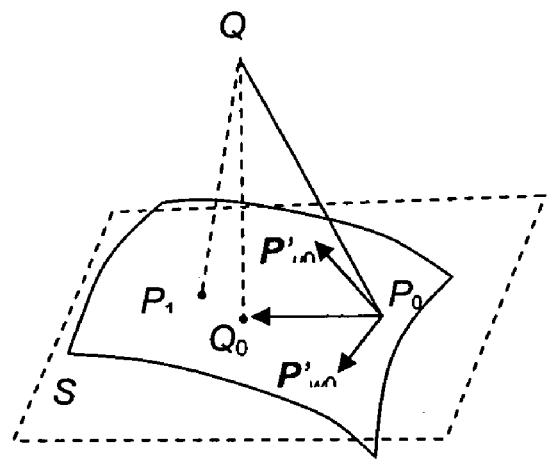
FIG. 4 shows exemplary computation of projection point on a surface to minimize second-degree separation

As shown in FIG. 4, assume $P_0 = P(u_0, w_0)$ is the projection point of Q on the normal surface $P = P(u, w)$ for the first iteration. $S_0$ is the tangent plane of P at $P_0$. The vector $\overrightarrow{P_0Q_0}$ is the projection of $\overrightarrow{P_0Q}$ on $S_0$. $P_1$ is the iteration result, i.e. the searching projection point. Let $$P'_{u_0} = \frac{\partial P}{\partial u}\Big|_{u=u_0, w=w_0} \quad (5)$$

$$P'_{w_0} = \frac{\partial P}{\partial w}\Big|_{u=u_0, w=w_0} \quad (6)$$

According to the basic property of the differential equation $$\overrightarrow{P_0Q_0} = P'_{u_0}\overrightarrow{\Delta u} + P'_{w_0}\overrightarrow{\Delta w} \quad (7)$$

The differential deviation vectors $\overrightarrow{\Delta u}$ and $\overrightarrow{\Delta w}$ can be used to compute $P_c = P(u_0 + \Delta u, w_0 + \Delta w)$. Since $P_c$ is in the neighborhood of $P_1$, $P_1 = P_c$ is assumed and $P_1$ is made as the next iteration point. If $|P_1 - P_0| \leqq \epsilon$ and the threshold $\epsilon$ are equal to the given value, the iteration operation is ended and $P_1$ is regarded as the projection point of Q on the normal surface.

Minimizing the Third-Degree Separation

The surface alignment aims to make the measured surface as close to the normal surface as possible. Although the two surfaces shall now be aligned closely with each other after the minimization of the second-degree separation, further fine-tuning may still be required. This may be achieved by adjusting three pairs of parameters along the respective three orthogonal directions so that a transfer matrix T is minimized to be below a predetermined threshold value λ. In each pair of the above parameters, one relates to translation and the other parameter relates to rotation along the direction.

It should be noted that it may not be necessary to refine three pairs of parameters along the respective three orthogonal directions in some cases. For example, if the two surfaces are know to correspond with each other exactly along two orthogonal directions, it may be necessary to refine as few as one pair of parameters.

Under the ideal conditions, the measured surface overlaps completely with the normal surface after surface alignment. The transfer matrix is defined as:

$$T(t_x, t_y, t_z, \alpha, \beta, \gamma) = \begin{bmatrix} \cos\beta\cos\gamma & \sin\alpha\sin\beta\cos\gamma - \cos\alpha\sin\gamma & \cos\alpha\sin\beta\cos\gamma + \sin\alpha\sin\gamma & t_x \\ \cos\beta\sin\gamma & \sin\alpha\sin\beta\sin\gamma + \cos\alpha\cos\gamma & \cos\alpha\sin\beta\sin\gamma - \sin\alpha\cos\gamma & t_y \\ -\sin\beta & \sin\alpha\cos\beta & \cos\alpha\cos\beta & t_z \\ 0 & 0 & 0 & 1 \end{bmatrix} \quad (8)$$

where α, β and γ are the rotation angles of measured surface along the x, y and z axes, respectively; $t_x$, $t_y$, and $t_z$ are the parallel shifts in the x, y and z directions, respectively.

Furthermore, the transfer matrix must satisfy the expense function:

$$\text{Min}[F_j(T)] = \text{Min}\left[\sum_{i=1}^{m} |T_j Q_{i,j} - P_{i,j}|^2\right] \quad (9)$$

and $$\text{Min}[F_2(T_{2j})] = \text{Min}[|D_{pi} - D_{vi}|] \quad (10)$$
$$= \text{Min}[|\max(T_{2j}Q_{i,j} - P_{i,j}) - \min(T_{2j}Q_{i,j} - P_{i,j})|]$$

where $P_{i,j} = [x'_{i,j}, y'_{i,j}, z'_{i,j}, 1]^T$ is the closest point of the normal surface to the measured point $Q_{i,j} = [x_{i,j}, y_{i,j}, z_{i,j}, 1]^T$ after the jth iteration of alignment, and m is the number of discrete points of the measured surface. Min[ ] denotes the minimum function while $P_{i,j}$ is the projection point of $Q_{i,j}$ on the normal surface.

The measured points after five-point pre-fixture and the iteration point $P_1$ are introduced into Eqs. (9) and (10), and then the equations are differentiated. The following equations relevant to the six parameters of $\alpha$, $\beta$, $\gamma$, $t_x$, $t_y$ and $t_z$ can be obtained:

$$\frac{\partial}{\partial T_{1j}}(F_1(T_{1j})) = 2\sum_{i=0}^{m}\left[|T_{1j}Q_{i,j} - P_{i,j}| \cdot \frac{\partial}{\partial T_{1j}}(|T_{1j}Q_{i,j} - P_{i,j}|)\right] = 0 \quad (11)$$

and $$\frac{\partial}{\partial T_{2j}}(F_2(T_{2j})) = \frac{\partial}{\partial T_{2j}}|\max(T_{2j}Q_{i,j} - P_{i,j}) - \min(T_{2j}Q_{i,j} - P_{i,j})| = 0 \quad (12)$$

When Eqs. (11) and (12) are solved, $T_{1j}$ and $T_{2j}$ are obtained with which the new coordinate transfer and optimal search of projection point can be performed. If the transfer matrix meets the requirements of $|T_{1j}| < \lambda$ and $|T_{2j}| < \lambda$ where $\lambda$ is a specified threshold, the coordinate transfer will not be conducted. This infers that the iterative precision adjustment is terminated and the alignment of measured and design surfaces is completed.

2.3 Parameters for the Characterization of the Form Error

After surface alignment, any point $P(x_i, y_i, z_i)$ on the first surface is close to the corresponding point $Q(x'_i, y'_i, z'_i)$ on the second surface. The distance between $P(x_i, y_i, z_i)$ and $Q(x'_i, y'_i, z'_i)$ is expressed as:

$$d_i = \pm\sqrt{(x_i - x'_i)^2 + (y_i - y'_i)^2 + (z_i - z'_i)^2} \quad (13)$$

If P is above Q in the z-direction, $d_i$ is positive otherwise negative. Hence, the following parameters can be defined to characterize the form error:

(i) Surface profile error ($S_t$) which is defined as:

$$S_t = |\max(d_i) - \min(d_i)| \quad (14)$$

where max( ) and min( ) are the maximum and minimum functions, respectively.

(ii) Root mean square deviation ($S_q$) which is defined as:

$$S_q = \sqrt{\frac{1}{m}\sum_{i=1}^{m} d_i^2} \quad (15)$$

with m is the number of points on the measured surface.

Figure 5:
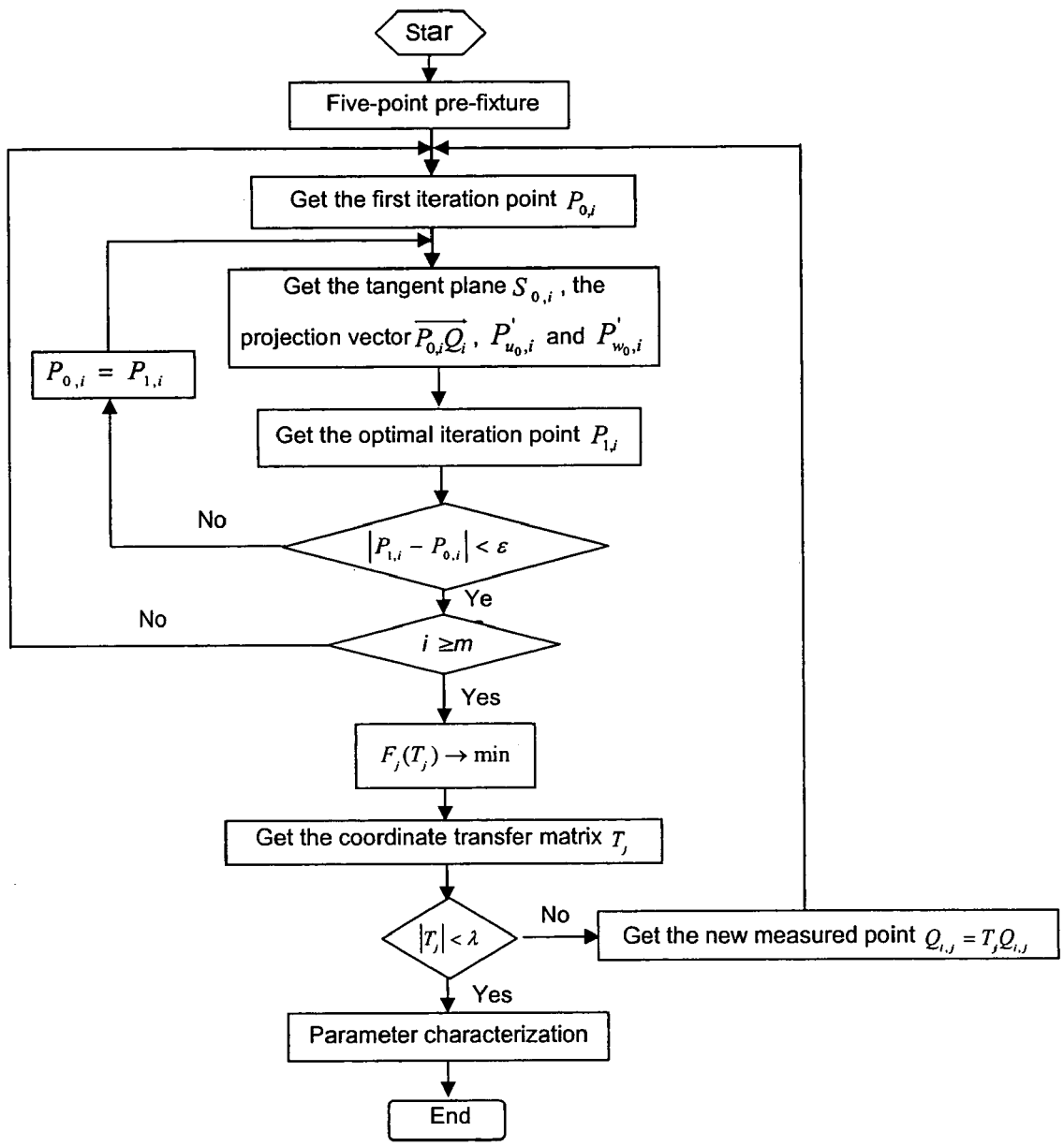
FIG. 5 shows the flow chart of form characterization for freeform surfaces of this invention.

To summarize the above discussion, FIG. 5 shows a flow chart of the steps involved in the surface alignment and the determination of the form errors of the two surfaces.

EXAMPLES

Figure 6:
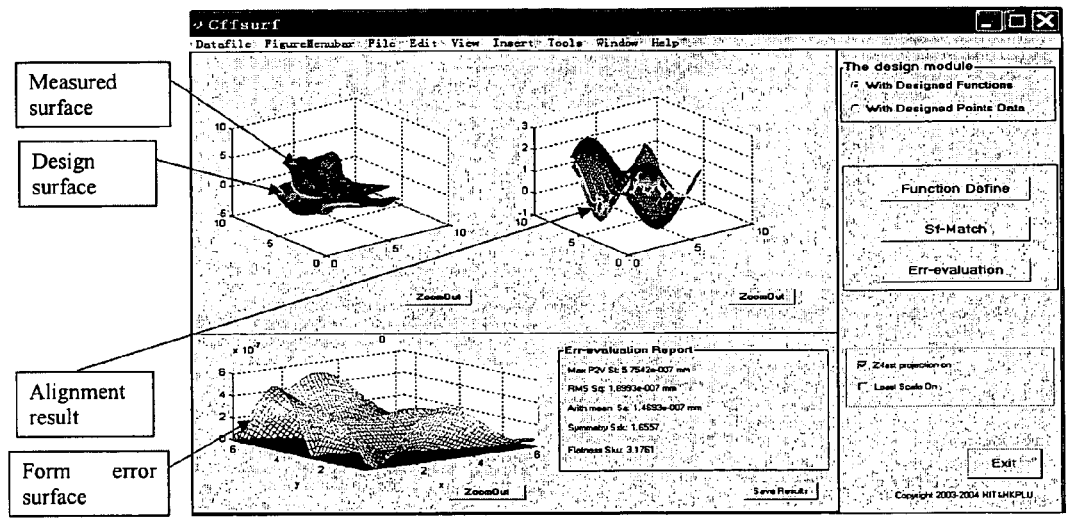
FIG. 6 shows the interface of a program written according to the form characterization for freeform surfaces of this invention.

To verify the method of this invention, an ultra-precision freeform measurement system is built which is composed of a data acquisition system and a software package incorporating the method of this invention. In the present study, a Form Talysurf PGI1240 surface measurement system is used as the data acquisition system for acquiring the surface data from the measured freeform surface. The measured data are fed and analyzed by the software package of this invention, which is written as a MATLAB program. A snapshot of the software is shown in FIG. 6. The surface alignment is done automatically by the software package. This eliminates the need of the trial-and-error approach for the alignment of the measured surface with the design surface which is commonly found in some interferometric type of measurement methods. With the use of the method of this invention, the surface alignment can be carried out for sampled area within a few minutes.

Basically, the experimental verification is composed of two parts i.e. Part I and Part II, respectively. Part I includes computer simulation experiments which were conducted to evaluate the theoretical accuracy of the method of this invention while actual measurements were untaken in Part II to verify accuracy.

Part I. Accuracy Evaluation by Computer Simulation

An ideal freeform design surface is simulated and adopted to generate the normal surface that is obtained by adjusting the six parameters of coordinate transfer matrix $T(t_x, t_y, t_z, \alpha, \beta, \gamma)$ and the number of points m on the measured surface. Then the form characterization is conducted according to the proposed method.

The ideal design surface is described by the equation below:

$$z = \sin(x) + \cos(y) + 1 \quad (16)$$

Figure 7:
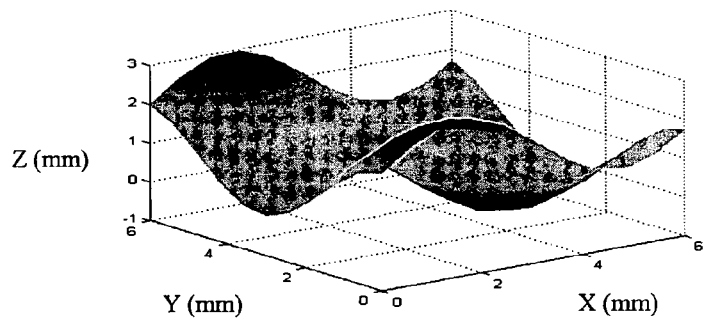
FIG. 7 shows a theoretical freeform surface used in the example.
Figure 8:
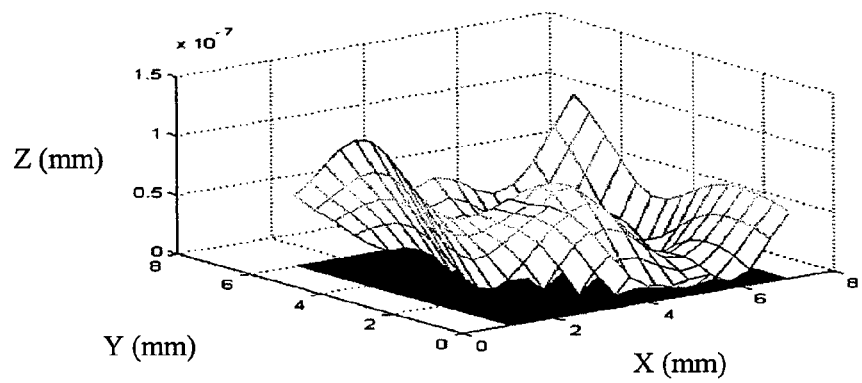
FIG. 8 shows matching error in the example with only x-shift.
Figure 9:
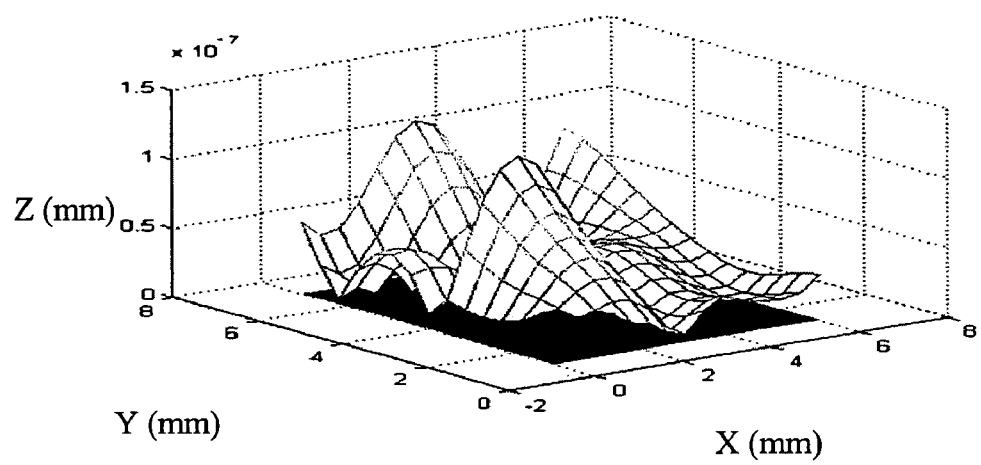
FIG. 9 shows matching error in the example with only y-shift.
Figure 10:
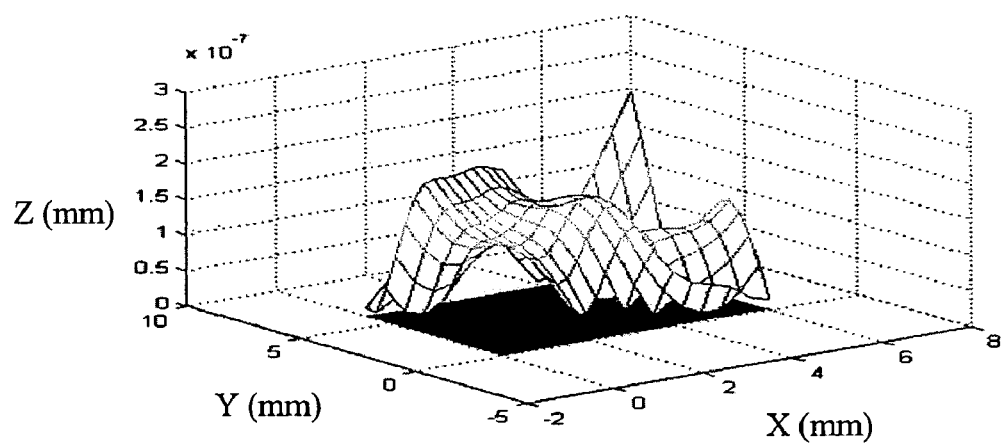
FIG. 10 shows matching error in the example with only z-shift.
Figure 11:
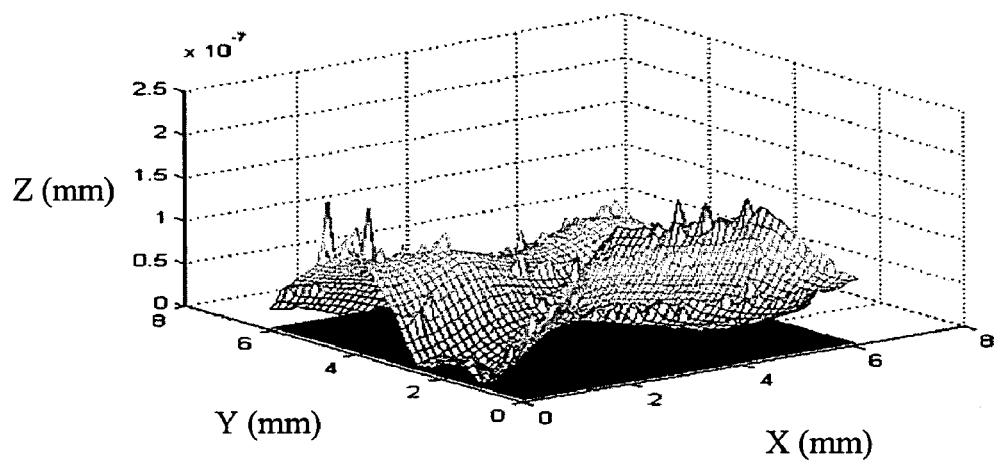
FIG. 11 shows matching error in the example with x-y-z-shift.
Figure 12:
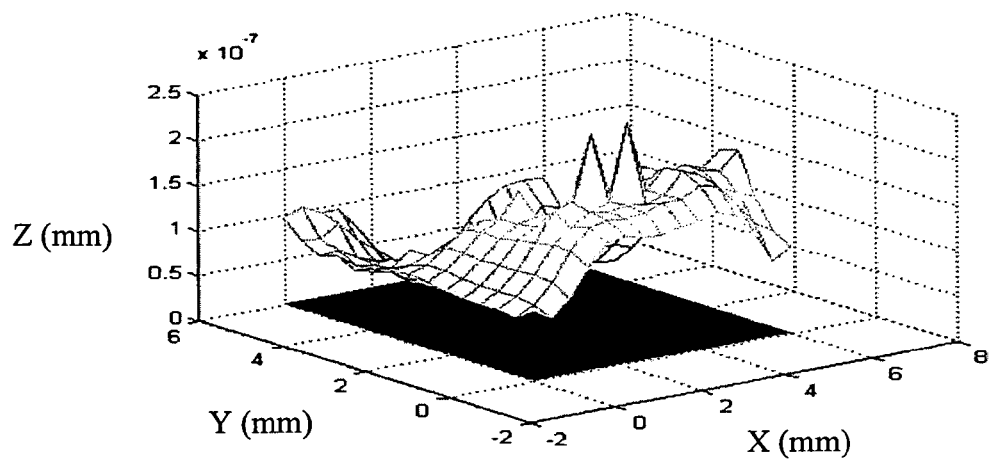
FIG. 12 shows matching error in the example with only x-rotation.
Figure 13:
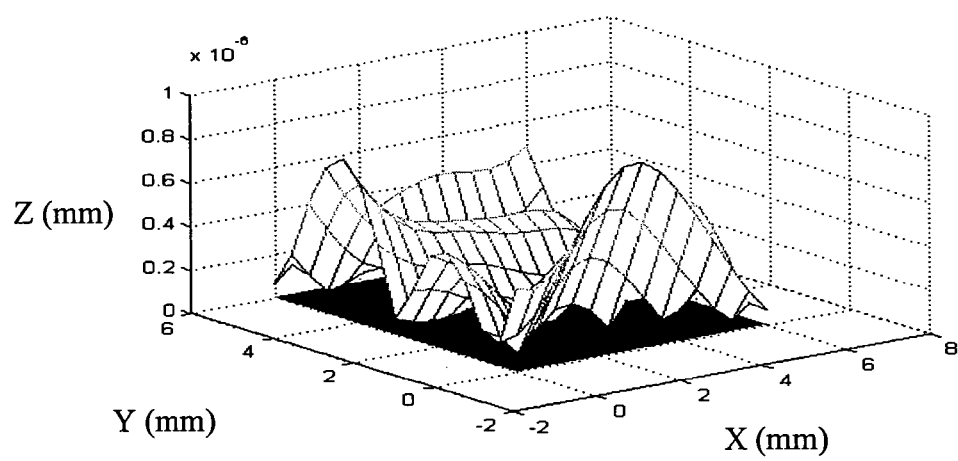
FIG. 13 shows matching error in the example with only y-rotation.
Figure 14:
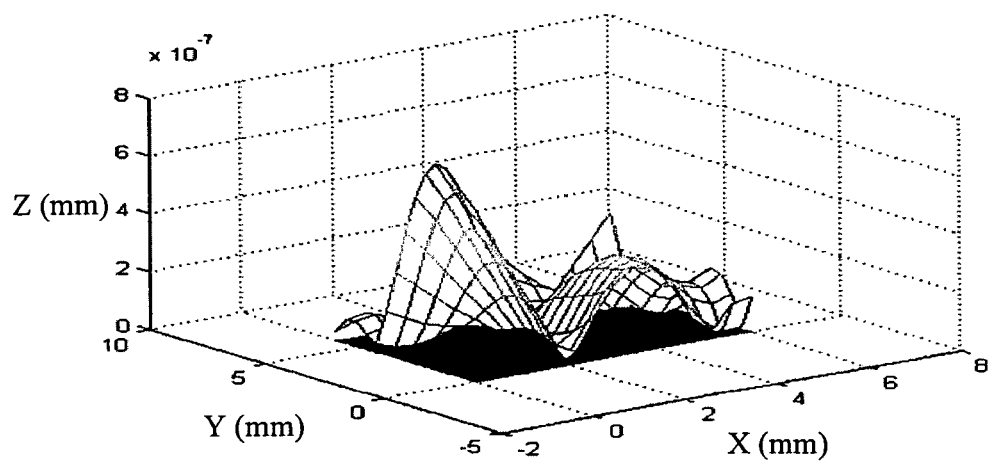
FIG. 14 shows matching error in the example with only z-rotation.
Figure 15:
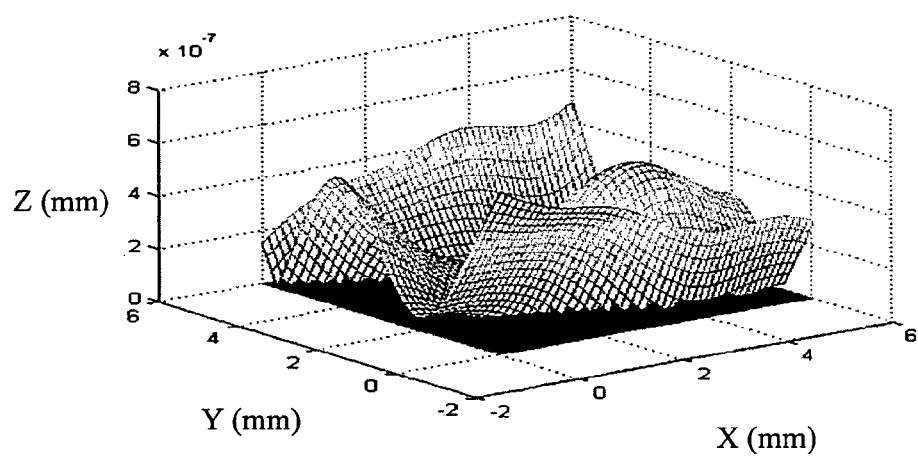
FIG. 15 shows matching error in the example with x-y-z-rotation.
Figure 16:
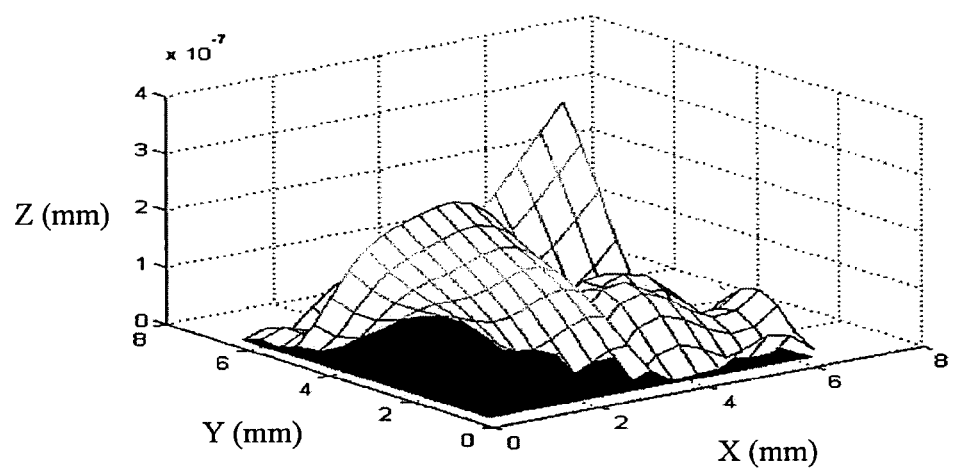
FIG. 16 shows matching error in the example with shift and rotation and 15×15-measured points.
Figure 17:
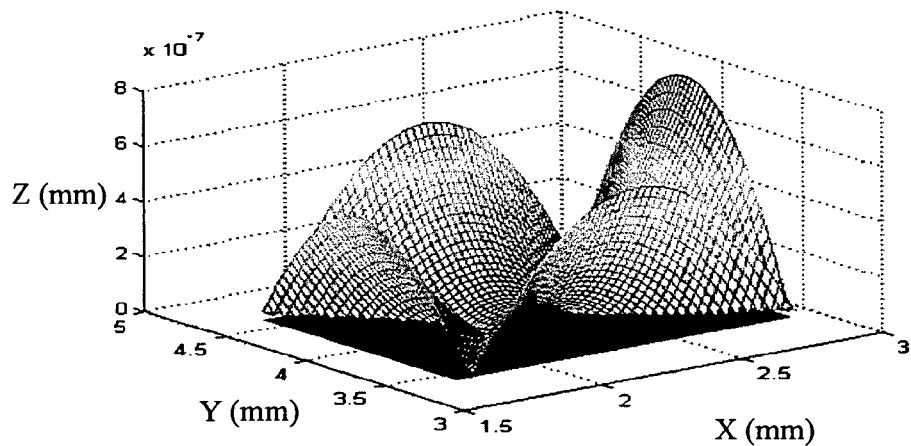
FIG. 17 shows matching error in the example with shift and rotation and 50×50-measured points.

This generates the normal surface as shown in FIG. 7. To obtain the corresponding measured surface, the six parameters of coordinate transfer matrix and the number of points are varied. Table 1 shows the results of the form characterization and the corresponding matching errors are shown in FIGS. 8 to 17.

TABLE 1

Accuracy analysis of surface alignment for freeform surface

| Parameters | $t_x$ | $t_y$ | $t_z$ | $\alpha$ | $\beta$ | $\gamma$ | m | $S_t$ (nm) | $S_q$ (nm) |
|---|---|---|---|---|---|---|---|---|---|
| Shift (mm) | 1 | 0 | 0 | 0 | 0 | 0 | 15 × 15 | 0.12299 | 0.48648 |
|  | 0 | 1 | 0 | 0 | 0 | 0 | 15 × 15 | 0.14343 | 0.46502 |

TABLE 1-continued

Accuracy analysis of surface alignment for freeform surface

| Parameters | $t_x$ | $t_y$ | $t_z$ | α | β | γ | m | $S_t$ (nm) | $S_q$ (nm) |
|---|---|---|---|---|---|---|---|---|---|
| | 0 | 0 | 1 | 0 | 0 | 0 | 15 × 15 | 0.25906 | 0.11261 |
| | 0.1 | 0.1 | 0.5 | 0 | 0 | 0 | 50 × 50 | 0.20301 | 0.07059 |
| Rotation (rar) | 0 | 0 | 0 | 0.3 | 0 | 0 | 15 × 15 | 0.23577 | 0.10403 |
| | 0 | 0 | 0 | 0 | 0.3 | 0 | 15 × 15 | 0.84990 | 0.31353 |
| | 0 | 0 | 0 | 0 | 0 | 0.3 | 15 × 15 | 0.71249 | 0.22094 |
| | 0 | 0 | 0 | 0.5 | 0.5 | 0.3 | 50 × 50 | 0.61587 | 0.23677 |
| Shift + | 0.3 | 0.5 | 2 | 0.5 | 0.5 | 0.3 | 15 × 15 | 0.36647 | 0.12060 |
| Rotation | 0.3 | 0.5 | 2 | 0.5 | 0.5 | 0.3 | 50 × 50 | 0.25255 | 0.17129 |

Since all measured surfaces are transferred directly from the ideal normal surface, the ideal form error should be zero. The simulated results indicate that form errors are resulted from the theoretical model as discussed in Section 2 below. In other words, the characterization results represent the error from the theoretical model. From Table 1, it is found that small errors are found when the surface is shifted or rotated in x, y and z directions, respectively.

To analyze the simulation results, it is interesting to note that different coordinate transfers have different effect on the characterization results. The error of the characterization increases as the transfer value increases. The influence of coordinate rotation on the error is less than that due to the coordinate shift. When the number of measured points increases, the error decreases accordingly. In other words, the accuracy of the characterization method can be increased by increasing the number of measured points. As shown in FIGS. 8 to 17, the form errors follow the same trend that is conformed to the distribution of the normal and measured surfaces. This infers that the error distribution is relevant to that of the characterized surfaces. Based on the results of the simulation experiment, the method of this invention is found to possess sub-nanometric accuracy, which is sufficient for the characterization of the form error of the ultra-precision freeform surfaces in at least sub-micrometer range.

Part II Actual Measurement of Real Optical Surfaces

Due to geometrical complexity of freeform surfaces, there are currently no universal standard freeform surfaces available in the market for establishing the reference requirements. Therefore, the actual measurement experiments in this section are divided into two steps. In the first step, the accuracy of the IFCM is verified through a comparative analysis conducted on an aspheric surface. The aspheric surface was measured by the traditional aspheric measurement method based on the Talymap software equipped in the Talysurf PGI1240 measurement system. The results of the measurement served as the evaluation requirements for comparing with that measured by the method of this invention. In the second step, a real ultra-precision freeform surface was measured by the method of this invention.

Verification of Measurement Accuracy

Figure 18:
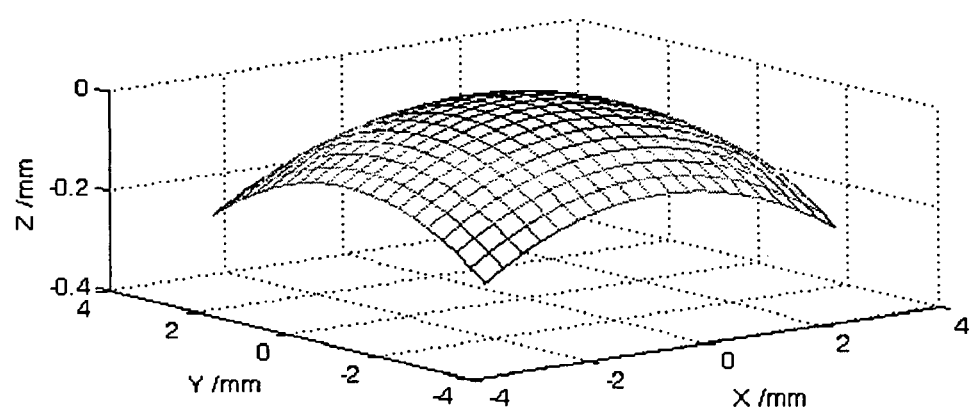
FIG. 18 shows exemplary design aspheric surface of cameral lens.
Figure 19:
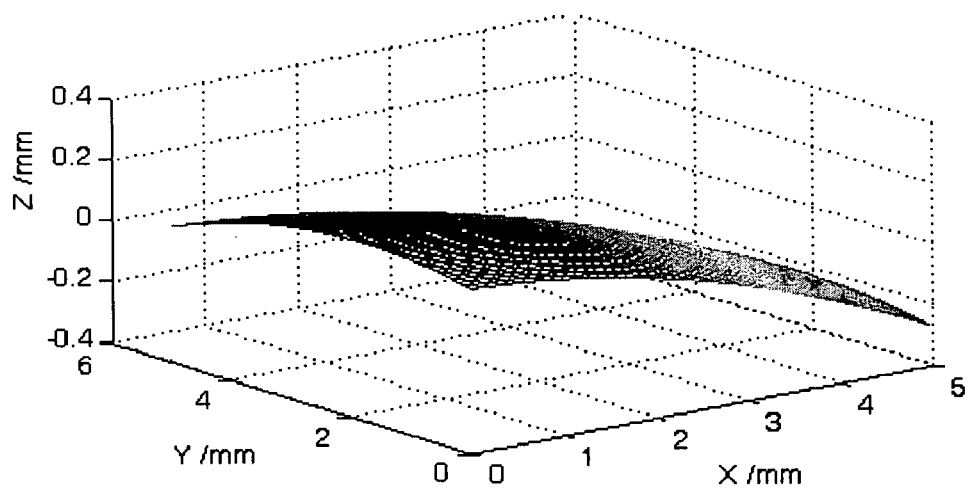
FIG. 19 shows exemplary measured surface of cameral lens.

To verify the accuracy of the measurement, an aspheric surface of an optical camera lens was machined by a two-axis CNC ultra-precision machine, Nanoform 300 from Taylor Hobson Pneumo Co. The design surface is shown in FIG. 18 and is described by the following optics equation:

$$z = \frac{Cp^2}{1+\sqrt{1-(K+1)C^2p^2}} + A_2 p^2 + \ldots + A_i p^i + \ldots + A_n p^n \quad (17)$$

where C=1/R and R is the radius of curvature of the best fit spherical surface; $p=\sqrt{x^2+y^2}$ is the distance from the optical axis Z; the conic constant K is a parameter for measuring the eccentricity of the conic surface; the even-numbered values of $A_i$ are aspheric deformation constants. The parameters of the design surface are listed in Table 2. The optical surface was measured by a Form Talysurf PGI 1240 freeform measurement system. The result of the measured surface is shown in FIG. 19.

TABLE 2

Parameters of the aspheric surface

| Optical parameters | Value |
|---|---|
| Radius of curvature, R | 36.47 mm |
| Conic constant, K | −0.751 |
| Aspheric deformation constants, $A_i$ | 0 |

Figure 20:
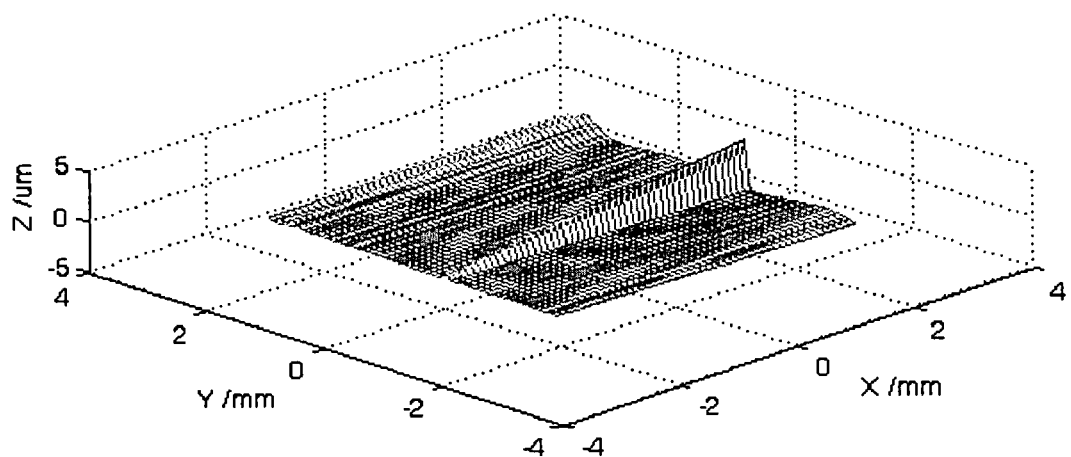
FIG. 20 shows the form error surface obtained by the method of this invention when the measured surface in FIG. 19 is compared with the design surface in FIG. 18.
Figure 21:
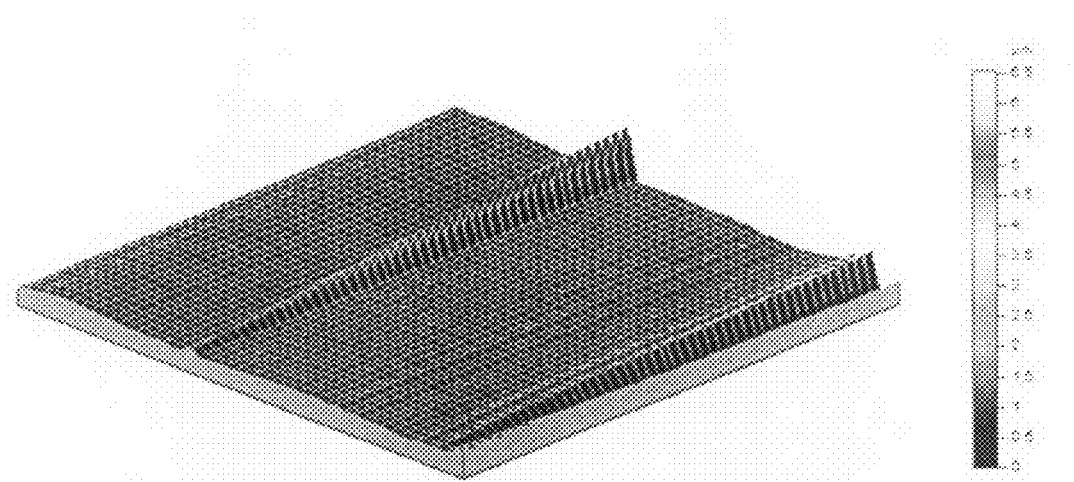
FIG. 21 shows the form error surface obtained by a traditional method (Talymap software)

The surface alignment is carried out and the form error of the surface obtained by the method of this invention is shown in FIG. 20. The results are compared with that measured by the traditional method based on Talymap software as shown in FIG. 21. Table 3 shows a comparison between the traditional and IFCM. It is found that the measurement results from the method of this invention agree well with that from the evaluation requirements established by the traditional method.

Measurement of an Ultra-Precision Freeform Surface

Figure 22:
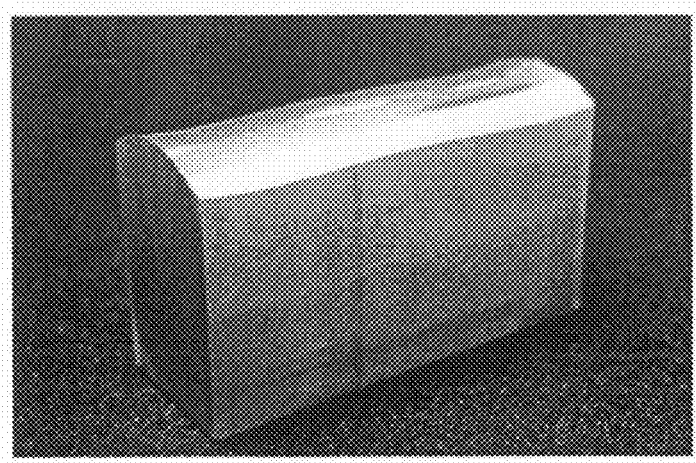
FIG. 22 shows a workpiece of F-theta lens insert.
Figure 23:
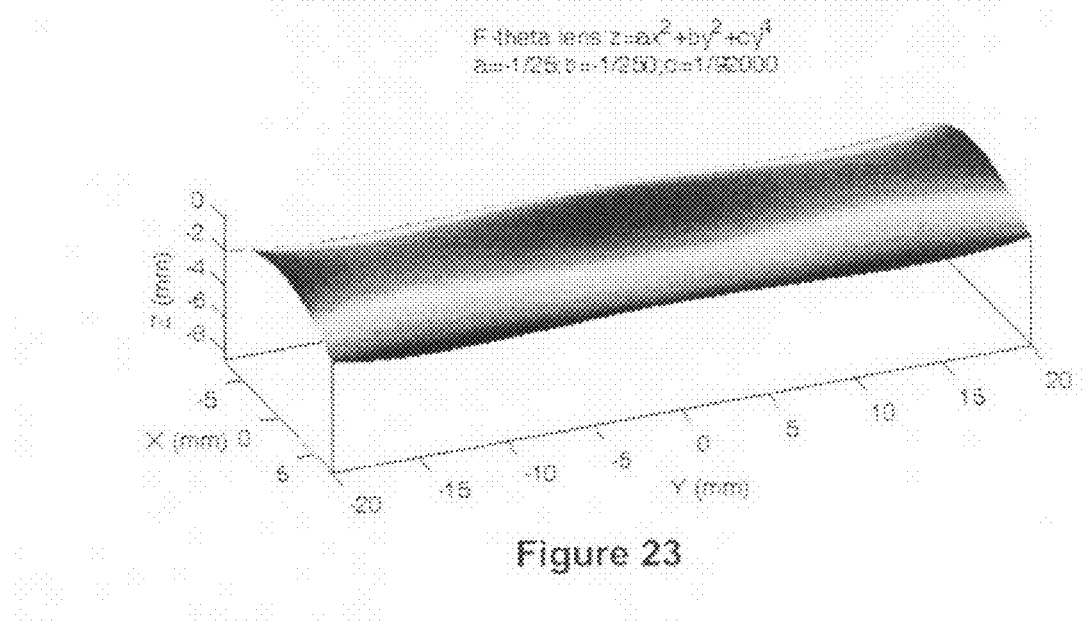
FIG. 23 shows the design surface of the insert of F-theta lens of FIG. 22.

To further evaluate the capability of this invention, a mould insert of the ultra-precision freeform surface of a F-theta lens was machined by a five-axis CNC ultra-precision freeform machining system (Freeform 705G) from Precitech Inc. in USA. FIG. 22 shows the machined workpiece. The design surface is shown in FIG. 23, which can be described as follows:

$$z=f(x,y)=ax^2+by^2+cy^4 \quad (18)$$

Where $a=-1/25$, $b=-1/250$ and $c=1/92000$. The ranges of x and y are −7.5 mm≤x≤7.5 mm and −20 mm≤y≤20 mm, respectively.

Figure 24:
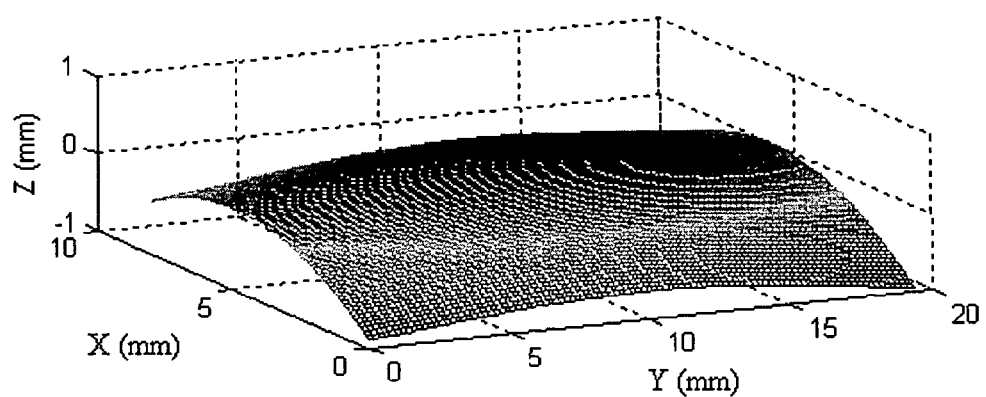
FIG. 24 shows the measured surface of the workpiece shown in FIG. 22.
Figure 25:
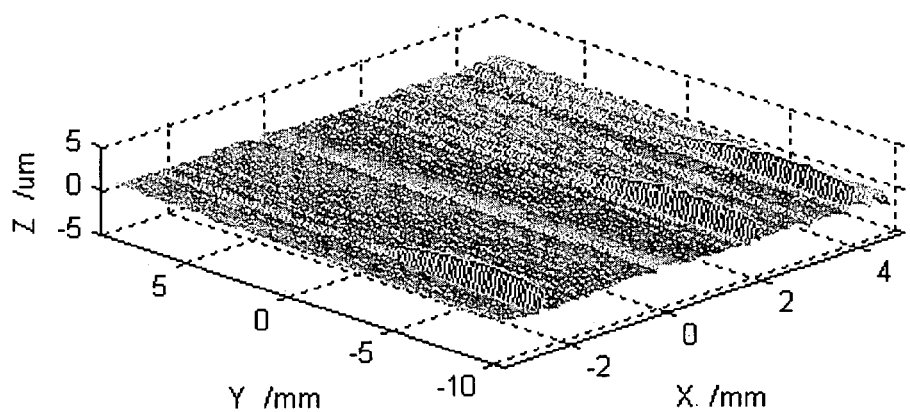
FIG. 25 shows the form error surface of the measured F-theta surface comparing with the design surface of FIG. 23.

The freeform surface was measured by the Form Talysurf PGI 1240 freeform measurement system from Taylor Hobson Co. Ltd. in UK. The result of the measured surface is shown in FIG. 24. The surface alignment was carried out according to this invention, and the form error of the measured surface is shown in FIG. 25. The surface profile error $S_t$ and root mean square deviation $S_q$ are found to be 5.4192 μm and 0.45848 μm, respectively. These error values can be used to adjust the resulting lens systems. This further verifies that the proposed IFCM is effective in the form characterization of ultra-precision freeform surfaces.

CONCLUSIONS

An integrated form characterization method (IFCM) is presented for the measurement of form accuracy of ultra-precision freeform surfaces. The method of this invention is based on feature-point pre-fixture, and iterative precision alignment algorithm. Surface parameters are also proposed to characterize the form error of ultra-precision freeform surfaces. Hence, an ultra-precision freeform surface measurement system is established based on this invention. The system is evaluated through a series of simulation and actual measurement experiments conducted on selected reference surfaces. The results indicate that this invention can realize the precise alignment of the measured and normal surfaces with accuracy in nanometer range. This provides sufficient capability of form characterization for ultra-precision freeform surfaces with form accuracy down to below sub-micrometer range. Due to the geometrical complexity of freeform surfaces, there is currently lack of definitive international standards and methods for surface characterization. The present invention contributes to at least the advancement of the ultra-precision freeform surface characterization.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A measuring method for measuring a free form surface having non-rotational symmetry by using a computer to align a first surface with a second surface, said first surface being a computer generated theoretical model of a free form surface or being a computer generated model of a free form surface generated from a plurality of measured points and said second surface being the measured free form surface, wherein $P(x_i, y_i, z_i)$ is any point on the first surface and $Q(x'_i, y'_i, z'_i)$ is any point on the second surface, said first surface and said second surface being separated by a first-degree separation, a second-degree separation, and a third-degree separation, said measuring method comprising the steps of:

minimizing the first-degree separation by the steps of:
  selecting at least one feature point from each of the first surface and the second surface;
  adjusting a coordinate of the second surface to minimize a distance between said at least one feature point of each of the first surface and the second surface to be below a predetermined threshold value $\theta$;

minimizing the second-degree separation by the steps of
  dividing the first surface into a plurality of first zones, each first zone having at least one first coordinate defining said first zone;
  dividing the second surface into a plurality of second zones, each second zone having at least one second coordinate defining said second zone;
  for the plurality of first zones, repeating the steps of:
    a) obtaining distances between the at least one first coordinate and each of the plurality of second zones;
    b) comparing the distances obtained in step a) to determine a pair of corresponding zones on the first and the second surfaces having a minimum distance obtained in step a);
    until all zones on the first and the second surfaces are paired;
  determining the distances between each pair of corresponding zones on the first and the second surfaces;
  obtaining a summation of the distances between each pair of corresponding zones;
  adjusting the coordinate of the second surface to minimize the summation of the distances between each pair of corresponding zones to be below a predetermined threshold value $\epsilon$;

minimizing the third-degree separation by the steps of:
  minimizing a transfer matrix T to be below a predetermined threshold value $\lambda$ by adjusting at least one pair of parameters along a direction, one of said parameters relating to translation and the other parameter relating to rotation along the direction.

2. The method of claim 1, wherein said at least one feature point includes five feature points.

3. The method of claim 2, wherein said five feature points includes a gravity center point G and four corner points.

4. The method of claim 3, wherein the gravity center point G is identified by the equation $$G(x_G, y_G, z_G) = \sum_{i=1}^{n} \alpha_i(x_i, y_i, z_i)$$

wherein $\alpha$ is a weighting coefficient satisfying $\Sigma \alpha_i = 1$, $\alpha_i = 1/n$ with n being the number of points in the respective measured and normal surfaces.

5. The method of claim 3, wherein the four corner points are identified as the four points that are farthest from the gravity center point G.

6. The method of claim 1, wherein $Q(x'_i, y'_i, z'_i)$ is obtained through a set of coordinates processed by a parameterization algorithm selected from the group consisting of Bezier surface algorithm, B-Spline algorithm, and Non-Uniform Rational B-Spline algorithm.

7. The method of claim 1, wherein each zone has a square shape.

8. The method of claim 1, wherein three pairs of parameters are adjusted along respective three orthogonal directions.

9. The method of claim 8, wherein the transfer matrix T is defined as:

$$T(t_x, t_y, t_z, \alpha, \beta, \gamma) = \begin{bmatrix} \cos\beta\cos\gamma & \sin\alpha\sin\beta\cos\gamma - \cos\alpha\sin\gamma & \cos\alpha\sin\beta\cos\gamma + \sin\alpha\sin\gamma & t_x \\ \cos\beta\sin\gamma & \sin\alpha\sin\beta\sin\gamma + \cos\alpha\cos\gamma & \cos\alpha\sin\beta\sin\gamma - \sin\alpha\cos\gamma & t_y \\ -\sin\beta & \sin\alpha\cos\beta & \cos\alpha\cos\beta & t_z \\ 0 & 0 & 0 & 1 \end{bmatrix}$$

where $\alpha$, $\beta$ and $\gamma$ are the rotation angles of the measured surface along x, y and z axes, respectively; and $t_x$, $t_y$ and $t_z$ are the parallel shifts in the x, y and z directions, respectively.

10. The method of claim 9, wherein T satisfying an expense function of $$\text{Min}[F_j(T)] = \text{Min}\left[\sum_{i=1}^{m}|T_jQ_{i,j} - P_{i,j}|^2\right],$$

where $P_{i,j}=[x'_{i,j}, y'_{i,j}, z'_{i,j}, 1]^T$ is the closest point of the normal surface to the measured point $Q_{i,j}=[x_{i,j}, y_{i,j}, z_{i,j}, 1]^T$ after $j^{th}$ iteration of alignment, and m is the number of discrete points of the measured surface, and Min[ ] denotes the minimum function while $P_{i,j}$ is the projection point of $Q_{i,j}$ on the normal surface.

11. A method of determining deviation between a first surface with a second surface, such that $P(x_i,y_i,z_i)$ is any point on the first surface and $Q(x'_i,y'_i,z'_i)$ is any point on the second surface, said first surface and said second surface being separated by a first-degree separation, a second-degree separation, and a third-degree separation, said method comprising the steps of:
aligning the first surface with the second surface according to the method of claim 1; and
calculating a distance $d_i$ between $P(x_i,y_i,z_i)$ and $Q(x'_i,y'_i,z'_i)$, wherein $$d_i = \pm\sqrt{(x_i-x'_i)^2+(y_i-y'_i)^2+(z_i-z'_i)^2}.$$

12. The method of claim 11 further including the step of calculating a profile error $S_f$, wherein $S_f=|\max(d_i)-\min(d_i)|$.

13. The method of claim 11 further including the step of calculating a root mean square deviation $S_q$ wherein $$S_q = \sqrt{\frac{1}{m}\sum_{i=1}^{m}d_i^2},$$

wherein the second surface is defined by m number of measured points.

14. A measuring apparatus for measuring a free form surface having non-rotational symmetry, the measuring apparatus comprising
a processor configured to align a first surface with a second surface using an aligning algorithm such that $P(x_i,y_i,z_i)$ is any point on the first surface and $Q(x'_i,y'_i,z'_i)$ is any point on the second surface, said first surface being a computer generated theoretical model of a free form surface or being a computer generated model of a free form surface generated from a plurality of measured points and said second surface being the measured free form surface,
said first surface and said second surface being separated by a first-degree separation, a second-degree separation, and a third-degree separation, said aligning algorithm for aligning the first and second surfaces using the steps of:
a) minimizing the first-degree separation by:
selecting at least one feature point from each of the first surface and the second surface;
adjusting coordinates of the second surface to minimize a distance between said at least one feature point of each of the first surface and the second surface to be below a predetermined threshold value θ;
b) minimizing the second-degree separation by
dividing the first surface into a plurality of first zones, each first zone having at least one first coordinate defining said first zone;
dividing the second surface into a plurality of second zones, each second zone having at least one second coordinate defining said second zone;
for the plurality of first zones, repeating the steps of:
c) obtaining distances between the at least one first coordinate and each of the plurality of second zones;
d) comparing the distances obtained in c) to determine a pair of corresponding zones on the first and the second surfaces having a minimum distance obtained in c);
until all zones on the on the first and the second surfaces are paired;
determining the distances between each pair of corresponding zones on the first and the second surfaces;
obtaining a summation of the distances between each pair of corresponding zones;
adjusting the coordinates of the second surface to minimize the summation of the distances between each pair of corresponding zones to be below a predetermined threshold value ε;
minimizing the third-degree separation by:
minimizing a transfer matrix T to be below a predetermined threshold value λ by adjusting at least one pair of parameters along a direction, one of said parameters relating to translation and the other parameter relating to rotation along the direction.

15. The apparatus of claim 14, wherein said at least one feature point includes five feature points.

16. The apparatus of claim 15, wherein said five feature points includes a gravity center point G and four corner points.

17. The apparatus of claim 16, wherein the gravity center point G is identified by the equation $$G(x_G, y_G, z_G) = \sum_{i=1}^{n}\alpha_i(x_i, y_i, z_i)$$

wherein α is a weighting coefficient satisfying $\Sigma\alpha_i=1$, $\alpha_i=1/n$ with n being the number of points in the respective measured and normal surfaces.

18. The apparatus of claim 16, wherein the four corner points are identified as the four points that are farthest from the gravity center point G.

19. The apparatus of claim 14, wherein $Q(x'_i,y'_i,z'_i)$ is obtained through a set of coordinates processed by a parameterization algorithm selected from the group consisting of Bezier surface algorithm, B-Spline algorithm, and Non-Uniform Rational B-Spline algorithm.

20. The apparatus of claim 14, wherein each zone has a square shape.

21. The apparatus of claim 14, wherein three pairs of parameters are adjusted along respective three orthogonal directions.

22. The apparatus of claim 21, wherein the transfer matrix T is defined as:

$$T(t_x, t_y, t_z, \alpha, \beta, \gamma) = \begin{bmatrix} \cos\beta\cos\gamma & \sin\alpha\sin\beta\cos\gamma - \cos\alpha\sin\gamma & \cos\alpha\sin\beta\cos\gamma + \sin\alpha\sin\gamma & t_x \\ \cos\beta\sin\gamma & \sin\alpha\sin\beta\sin\gamma + \cos\alpha\cos\gamma & \cos\alpha\sin\beta\sin\gamma - \sin\alpha\cos\gamma & t_y \\ -\sin\beta & \sin\alpha\cos\beta & \cos\alpha\cos\beta & t_z \\ 0 & 0 & 0 & 1 \end{bmatrix}$$

where α, β and γ are the rotation angles of the measured surface along x, y and z axes, respectively; and $t_x$, $t_y$ and $t_z$ are the parallel shifts in the x, y and z directions, respectively.

23. The apparatus of claim 22, wherein T satisfying an expense function of $$\text{Min}[F_j(T)] = \text{Min}\left[\sum_{i=1}^{m} |T_j Q_{i,j} - P_{i,j}|^2\right],$$

where $P_{i,j} = [x'_{i,j}, y'_{i,j}, z'_{i,j}, 1]^T$ is the closest point of the normal surface to the measured point $Q_{i,j} = [x_{i,j}, y_{i,j}, z_{i,j}, 1]^T$ after $j^{th}$ iteration of alignment, and m is the number of discrete points of the measured surface, and Min[ ] denotes the minimum function while $P_{i,j}$ is the projection point of $Q_{i,j}$ on the normal surface.

24. A measuring apparatus for determining deviation between a first free form surface and a second measured free form surface, the measuring apparatus comprising
a processor including a deviation determining algorithm, said first surface being a computer generated theoretical model of a free form surface or being a computer generated model of a free form surface generated from a plurality of measured points such that $P(x_i,y_i,z_i)$ is any point on the first surface and $Q(x'_i,y'_i,z'_i)$ is any point on the second surface, said first surface and said second surface being separated by a first-degree separation, a second-degree separation, and a third-degree separation,
said deviation determining algorithm determining a deviation between the first and second surfaces by aligning the first surface with the second surface by minimizing the first-degree separation by
selecting at least one feature point from each of the first surface and the second surface;
adjusting a coordinate of the second surface to minimize a distance between said at least one feature point of each of the first surface and the second surface to be below a predetermined threshold value θ; minimizing the second-degree separation by
dividing the first surface into a plurality of first zones, each first zone having at least one first coordinate defining said first zone;
dividing the second surface into a plurality of second zones, each second zone having at least one second coordinate defining said second zone;
for the plurality of first zones, repeating
a) obtaining distances between the at least one first coordinate and each of the plurality of second zones;
b) comparing the distances obtained in a) to determine a pair of corresponding zones on the first and the second surfaces having a minimum distance obtained in a);
until all zones on the first and the second surfaces are paired;
determining the distances between each pair of corresponding zones on the first and the second surfaces;
obtaining a summation of the distances between each pair of corresponding zones;
adjusting the coordinate of the second surface to minimize the summation of the distances between each pair of corresponding zones to be below a predetermined threshold value ε;
minimizing the third-degree separation by
minimizing a transfer matrix T to be below a predetermined threshold value λ by adjusting at least one pair of parameters along a direction, one of said parameters relating to translation and the other parameter relating to rotation along the direction; and calculating a distance $d_i$ between $P(x_i,y_i,z_i)$ and $Q(x'_i,y'_i,z'_i)$, wherein $d_i = \pm \sqrt{(x_i-x'_i)^2+(y_i-y'_i)^2+(z_i-z'_i)^2}$.

25. The measuring apparatus of claim 24, further including the step of calculating a profile error $S_t$, wherein $S_t = |\max(d_i) - \min(d_i)|$.

26. The measuring apparatus of claim 24, further including the step of calculating a root mean square deviation $S_q$ wherein $$S_q = \sqrt{\frac{1}{m}\sum_{i=1}^{m} d_i^2},$$

wherein the second surface is defined by m number of measured points.

* * * * *

UNITED STATES PATENT AND TRADEMARK OFFICE
CERTIFICATE OF CORRECTION

PATENT NO. : 7,619,749 B2  
APPLICATION NO. : 11/511361  
DATED : November 17, 2009  
INVENTOR(S) : Cheung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this

Fourteenth Day of December, 2010

David J. Kappos  
*Director of the United States Patent and Trademark Office*